Nov. 10, 1931.  G. W. HALL  1,830,940
WHEEL GUARD APRON
Filed July 5, 1928
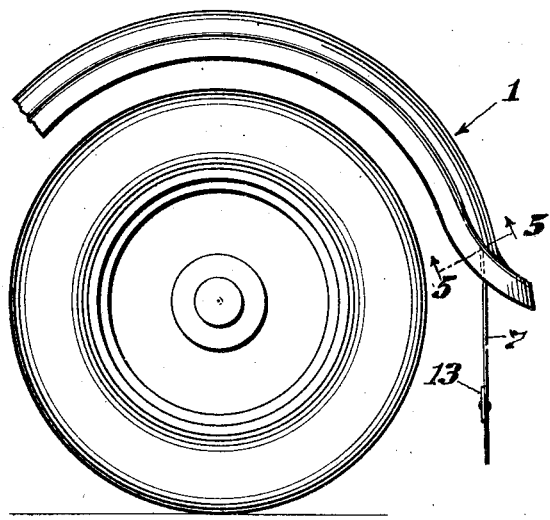
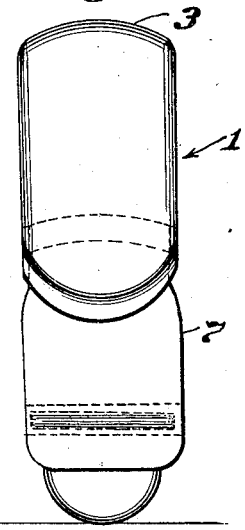
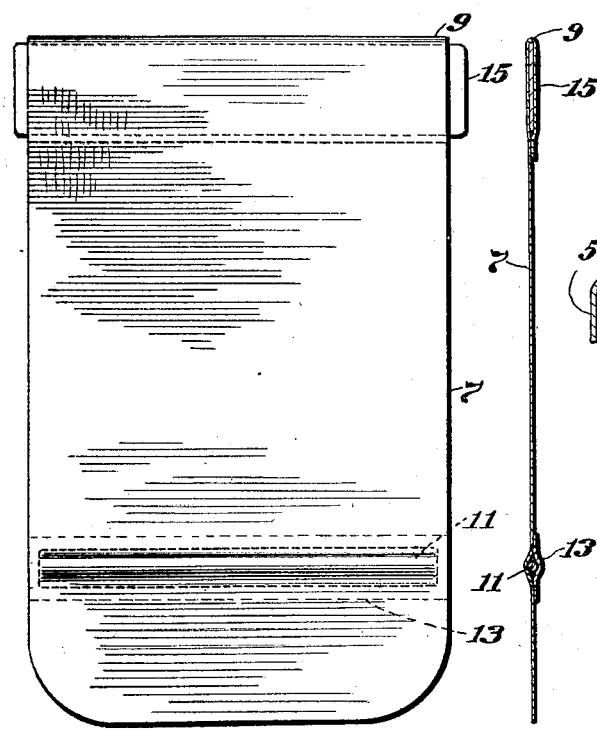
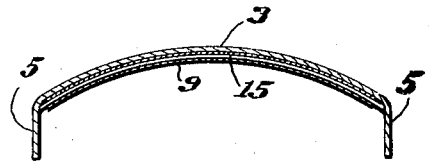
INVENTOR:
George Walter Hall
BY Henry T. Williams,
ATTORNEY Patented Nov. 10, 1931

1,830,940

UNITED STATES PATENT OFFICE

GEORGE WALTER HALL, OF LACONIA, NEW HAMPSHIRE, ASSIGNOR TO PERSONS-MAJESTIC MANUFACTURING COMPANY, OF WORCESTER, MASSACHUSETTS, A CORPORATION OF MASSACHUSETTS

WHEEL GUARD APRON

Application filed July 5, 1928. Serial No. 290,312.

The invention to be hereinafter described relates to aprons for connection with the rear ends of wheel guards or fenders of automobiles or other vehicles.

In travelling over wet or muddy roads the ordinary wheel guards do not prevent water and mud from being thrown by the wheels onto the body and other parts of the automobile and onto closely following automobiles.

One aim and purpose of the present invention, therefore, is to provide a simple, cheap apron which may depend from the rear end of a wheel guard, constitute an extension thereof and prevent objectionable rearward throwing of water or mud. Another purpose is to provide an apron which may be quickly and easily connected to or removed from the ordinary wheel guard without alteration of the guard and without requiring use of tools.

The character of the invention may be best understood by reference to the following description of one good form thereof shown in the accompanying drawings wherein:

Figure 1 is a side elevation of an automobile wheel having a guard equipped with an apron embodying the invention;

Fig. 2 is an end view looking toward the right of Fig. 1;

Fig. 3 on an enlarged scale is a face view of the apron;

Fig. 4 is a longitudinal section through the apron; and

Fig. 5 is a transverse section through the guard taken on the line 5—5 of Fig. 1.

Referring to the drawings, 1 designates the ordinary form of wheel guard having a longitudinally curved and slightly transversely curved body 3 with short flanges 5 projecting down therefrom. The apron shown herein as one good embodiment of the invention comprises a flap 7 of waterproofed canvas or other suitable material. The upper end of the flap is folded over onto the body of the strip and the edge is stitched thereto thereby forming a loop 9. Intermediate the upper and lower ends of the strip and preferably nearer the lower end, is a spreader member desirably in the form of a metal rod 11 secured to the strip by a fabric ribbon 13 stitched to the strip, as will be noted in Fig. 3.

To detachably secure the strip to the rear end of a wheel guard a spring steel bar 15 is inserted in the loop, referred to, and may or may not be secured to the strip as desired.

When it is desired to attach the apron to a wheel guard it is merely necessary to present the spring bar to the under face of the rear end of the guard and to press said bar in between the flanges of the guard. The length of the bar 15 is such that it will be slightly flexed when placed between the guard flanges, and, as shown in Fig. 5, the flexed bar will conform the attached flap 7 to the contour of the under face of the curved wheel guard body 3. Furthermore, its inherent resistance will cause the bar to tend to flatten and press its ends firmly against the flanges 5, thereby to secure the apron to the guard.

By my invention an apron is provided which may quickly and easily be applied to or removed from a wheel guard, without the use of tools and will prevent objectionable throwing of water and mud on parts of the automobile, closely following automobiles and nearby pedestrians.

It will be understood that the invention is not limited to the specific embodiment shown and that various deviations may be made therefrom without departing from the spirit and scope of the appended claims.

Having thus described my invention, what I desire to claim as new is:

1. A splash guard for vehicles having a mud guard with substantially parallel walls, comprising a strip of resilient flexible material, of greater length than the distance between the said walls and adapted by bending to arcuate form to be forced in between said walls, said strip tending by its resiliency to force its ends outwardly whereby a gripping engagement of said ends with said walls is maintained, and a boot member supported upon said strip.

2. A splash guard for vehicles having a mud guard with substantially parallel walls comprising a flexible boot having a hem at its upper end, a resilient metal strip located within the hem, said strip being of a length slightly greater than the distance between the parallel walls of said mud guard and being adapted to be located between said walls by bending it so that it engages said walls and holds itself and said boot in place by its own resiliency, said strip being of such length that when it is bent and its ends are in engagement with the walls said strip will hold said boot in tight contact with the inner face of the mud guard substantially throughout the entire width of said boot.

3. A splash guard for a vehicle fender providing downwardly extending spaced walls, comprising a flexible boot or flap supported at its upper end by a resilient, metal member adapted by its flexure to be located between the walls of said fender, said boot supporting member being of such length that when flexed between the fender walls, it will conform said boot to the contour of the under face of the fender.

4. A splash guard for a vehicle fender providing a curved crown bounded by downwardly extending spaced flanges, comprising a flexible boot or flap having a loop at its upper end and a resilient metal member passing through said loop for supporting said boot, said boot supporting member having an over-all length greater than the distance between said fender flanges and being adapted by its transverse flexure to be located between said fender flanges in gripping engagement therewith, the flexed portion of said supporting member passing through said loop serving to conform said boot to the contour of the curved under face of said fender crown.

GEORGE WALTER HALL.

CERTIFICATE OF CORRECTION.

Patent No. 1,830,940. Granted November 10, 1931, to

GEORGE WALTER HALL.

It is hereby certified that error appears in the printed specification of the above numbered patent requiring correction as follows: Page 1, lines 45, 47, 50, 51, 53, and 56, for the word "strip" read flap; and that the said Letters Patent should be read with these corrections therein that the same may conform to the record of the case in the Patent Office.

Signed and sealed this 9th day of February, A. D. 1932.

(Seal)

M. J. Moore,
Acting Commissioner of Patents.